(12) United States Patent
Pedersen (10) Patent No.: US 10,893,570 B2
(45) Date of Patent: Jan. 12, 2021

(54) METHOD AND APPARATUS FOR PAUSING UPLINK TRANSMISSION TIME INTERVAL

(71) Applicant: Nokia Technologies Oy, Espoo (FI)

(72) Inventor: Klaus Pedersen, Aalborg (DK)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 16/099,755

(22) PCT Filed: May 12, 2016

(86) PCT No.: PCT/FI2016/050315
§ 371 (c)(1),
(2) Date: Nov. 8, 2018

(87) PCT Pub. No.: WO2017/194822
PCT Pub. Date: Nov. 16, 2017

(65) Prior Publication Data
US 2019/0141778 A1    May 9, 2019

(51) Int. Cl.
*H04W 76/28* (2018.01)
*H04W 4/90* (2018.01)
*H04W 4/06* (2009.01)
*H04W 72/04* (2009.01)
*H04W 72/14* (2009.01)

(52) U.S. Cl.
CPC ............ *H04W 76/28* (2018.02); *H04W 4/06* (2013.01); *H04W 4/90* (2018.02); *H04W 72/0446* (2013.01); *H04W 72/14* (2013.01)

(58) Field of Classification Search
None
See application file for complete search history.

(56) References Cited

U.S. PATENT DOCUMENTS

| 2009/0111383 A1* | 4/2009 | Eckert | H04W 24/02 455/67.11 |
| 2009/0176494 A1* | 7/2009 | Lee | H04W 36/0055 455/436 |
| 2011/0237287 A1* | 9/2011 | Klein | H04W 76/50 455/521 |
| 2012/0105637 A1* | 5/2012 | Yousefi | G06F 1/26 348/148 |

(Continued)

FOREIGN PATENT DOCUMENTS

WO    WO-2013172333 A1 * 11/2013 ............ H04W 74/08

OTHER PUBLICATIONS

3GPP TSG-RAN WG1 #86-BIS, Lisbon, Portugal, Oct. 10-14, 2016, R1-1609749, "Pause-Resume Scheduling for Low Latency Transmissions", Nokia, Alcatel-Lucent Shanghai Bell, 4 pgs.

(Continued)

*Primary Examiner* — Jay P Patel
(74) *Attorney, Agent, or Firm* — Harrington & Smith (57) ABSTRACT

There is provided a method comprising causing transmission of a first uplink transmission from a first user device, the first uplink transmission having a transmission time interval comprising a plurality of subframes, receiving information from a base station, the information comprising an indication to pause transmission of the first uplink transmission for N subframes, pausing transmission of the first uplink transmission for N subframes and causing, after N subframes, continued transmission of the first uplink transmission.

19 Claims, 6 Drawing Sheets

S1 — Causing transmission of a first uplink transmission from a first user device, the first uplink transmission having a transmission time interval comprising a plurality of subframes S2 — Receiving information from a base station, the information comprising an indication to pause transmission of the first uplink transmission for N subframes S3 — Pausing transmission of the first uplink transmission for N subframes S4 — Causing, after N subframes, continued transmission of the first uplink transmission (56) References Cited

U.S. PATENT DOCUMENTS

| | | | |
|---|---|---|---|
| 2012/0173905 A1* | 7/2012 | Diab | H04L 12/66 |
| | | | 713/320 |
| 2015/0005027 A1* | 1/2015 | Zeng | H04W 52/40 |
| | | | 455/522 |
| 2015/0138965 A1* | 5/2015 | Takahashi | H04W 74/008 |
| | | | 370/230 |
| 2015/0264662 A1 | 9/2015 | Sahlin et al. | |
| 2015/0319298 A1* | 11/2015 | Corretjer | H04M 3/2236 |
| | | | 455/404.1 |
| 2016/0044730 A1* | 2/2016 | Baghel | H04W 72/02 |
| | | | 370/329 |
| 2016/0112992 A1* | 4/2016 | Bhushan | H04L 5/0042 |
| | | | 370/330 |
| 2016/0189562 A1* | 6/2016 | Vaughan | G09B 19/00 |
| | | | 434/308 |
| 2016/0270116 A1* | 9/2016 | Lin | H04W 72/14 |
| 2017/0013653 A1* | 1/2017 | Suzuki | H04W 48/12 |
| 2017/0295592 A1* | 10/2017 | Yang | H04W 72/1215 |
| 2018/0279388 A1* | 9/2018 | Miao | H04W 16/02 |
| 2019/0260526 A1* | 8/2019 | Zhang | H04L 27/2675 |

OTHER PUBLICATIONS

3GPP TSG-RAN2 Meeting #83bis, Oct. 7-11, 2013, Ljubljana, Slovenia, R2-133351, "TTI Bundle Shifting", LG Electronics Inc., 2 pgs.

* cited by examiner

METHOD AND APPARATUS FOR PAUSING UPLINK TRANSMISSION TIME INTERVAL

This patent application is a U.S. National Stage application of International Patent Application Number PCT/FI2016/050315 filed May 12, 2016, which is hereby incorporated by reference in its entirety.

FIELD

The present application relates to a method, apparatus, system and computer program and in particular but not exclusively to a method and apparatus for uplink scheduling functionality.

BACKGROUND

A communication system can be seen as a facility that enables communication sessions between two or more entities such as user terminals, base stations/access points and/or other nodes by providing carriers between the various entities involved in the communications path. A communication system can be provided for example by means of a communication network and one or more compatible communication devices. The communication sessions may comprise, for example, communication of data for carrying communications such as voice, electronic mail (email), text message, multimedia and/or content data, machine type communications (MTC), which may have mission critical communication requirements, and so on. Non-limiting examples of services provided comprise two-way or multi-way calls, data communication or multimedia services and access to a data network system, such as the Internet.

In a wireless communication system at least a part of a communication session between at least two stations occurs over a wireless link.

Wireless communication devices can be of different types. Wireless communication devices may or may not need human interaction. A wireless communication device of a user is often referred to as user equipment (UE). Wireless communication devices that do not necessarily need human interaction for communication are sometimes referred to as machine type communication (MTC) devices. A communication device is provided with an appropriate signal receiving and transmitting apparatus for enabling communications, for example enabling access to a communication network or communications directly with other users. The communication device may access a carrier provided by a station or access point, and transmit and/or receive communications on the carrier.

The communication system and associated devices typically operate in accordance with a given standard or specification which sets out what the various entities associated with the system are permitted to do and how that should be achieved. Communication protocols and/or parameters which shall be used for the connection are also typically defined. One example of a communications system is UTRAN (3G radio). Another example is the long-term evolution (LTE) of the Universal Mobile Telecommunications System (UMTS) radio-access technology. LTE is being standardized by the 3rd Generation Partnership Project (3GPP). A further example is the so-called 5G or New Radio (the term used by 3GPP) networks. Standardization of 5G or New Radio networks is currently under discussion.

SUMMARY

In a first aspect there is provided a method comprising causing transmission of a first uplink transmission from a first user device, the first uplink transmission having a transmission time interval comprising a plurality of subframes, receiving information from a base station, the information comprising an indication to pause transmission of the first uplink transmission for N subframes, pausing transmission of the first uplink transmission for N subframes and causing, after N subframes, continued transmission of the first uplink transmission.

At least one of a second uplink transmission and a downlink transmission may be scheduled during at least a portion of the N subframes.

The at least one second uplink transmission may be scheduled for the first user device or a second user device.

The first uplink transmission may be associated with at least one of a mobile broadband service and a massive machine communication service. The at least one of the second uplink transmission and downlink transmission may be associated with a mission critical communication service.

The method may comprise pausing the first uplink transmission during the transmission time interval.

N may be preconfigured.

N may be equal to 1.

The information may comprise an indication of N.

The information may comprise an indication to pause the first uplink transmission, and subsequently, after N subframes, an indication to continue the first uplink transmission The method may comprise receiving the information on a physical layer control channel.

The method may comprise receiving a scheduling grant for the first uplink transmission on the physical layer control channel.

Receiving the information may comprise determining at each subframe of the first uplink transmission whether the information has been received.

In a second aspect, there is provided a method comprising receiving a first uplink transmission from a first user device, the first uplink transmission having a transmission time interval comprising a plurality of subframes, providing information to the user device, the information comprising an indication to pause transmission of the first uplink transmission for N subframes and receiving, after N subframes, continued transmission of the first uplink transmission.

The first uplink transmission may be paused during the transmission time interval.

The method may comprise scheduling at least one of a second uplink transmission and downlink transmission during at least a portion of the N subframes.

The method may comprise scheduling the second uplink transmission during the N subframes and receiving the second uplink transmission during at least a portion of N subframes.

The first uplink transmission may be associated with at least one of a mobile broadband service and a massive machine communication service. The at least one of the second uplink transmission and downlink transmission may be associated with a mission critical communication service.

N may be preconfigured.

N may be equal to 1.

The information may comprise an indication of N.

The information may comprise an indication to pause the first uplink transmission, and subsequently, after N subframes, an indication to continue the first uplink transmission The method may comprise providing the information on a physical layer control channel.

The method may comprise providing a scheduling grant for the first uplink transmission on the physical layer control channel.

In a third aspect, there is provided an apparatus comprising means for causing transmission of a first uplink transmission from a first user device, the first uplink transmission having a transmission time interval comprising a plurality of subframes, means for receiving information from a base station, the information comprising an indication to pause transmission of the first uplink transmission for N subframes, means for pausing transmission of the first uplink transmission for N subframes and means for causing, after N subframes, continued transmission of the first uplink transmission.

At least one of a second uplink transmission and a downlink transmission may be scheduled during at least a portion of the N subframes.

The at least one second uplink transmission may be scheduled for the first user device or a second user device.

The first uplink transmission may be associated with at least one of a mobile broadband service and a massive machine communication service. The at least one of the second uplink transmission and downlink transmission may be associated with a mission critical communication service.

The apparatus may comprise means for pausing the first uplink transmission during the transmission time interval.

N may be preconfigured.

N may be equal to 1.

The information may comprise an indication of N.

The information may comprise an indication to pause the first uplink transmission, and subsequently, after N subframes, an indication to continue the first uplink transmission The apparatus may comprise means for receiving the information on a physical layer control channel.

The apparatus may comprise means for receiving a scheduling grant for the first uplink transmission on the physical layer control channel.

Receiving the information may comprise determining at each subframe of the first uplink transmission whether the information has been received.

In a fourth aspect, there is provided an apparatus comprising means for receiving a first uplink transmission from a first user device, the first uplink transmission having a transmission time interval comprising a plurality of subframes, means for providing information to the user device, the information comprising an indication to pause transmission of the first uplink transmission for N subframes and means for receiving, after N subframes, continued transmission of the first uplink transmission.

The first uplink transmission may be paused during the transmission time interval.

The apparatus may comprise means for scheduling at least one of a second uplink transmission and downlink transmission during at least a portion of the N subframes.

The apparatus may comprise means for scheduling the second uplink transmission during the N subframes and means for receiving the second uplink transmission during at least a portion of N subframes.

The first uplink transmission may be associated with at least one of a mobile broadband service and a massive machine communication service. The at least one of the second uplink transmission and downlink transmission may be associated with a mission critical communication service.

N may be preconfigured.

N may be equal to 1.

The information may comprise an indication of N.

The information may comprise an indication to pause the first uplink transmission, and subsequently, after N subframes, an indication to continue the first uplink transmission The apparatus may comprise means for providing the information on a physical layer control channel.

The apparatus may comprise means for providing a scheduling grant for the first uplink transmission on the physical layer control channel.

In a fifth aspect there is provided an apparatus comprising at least one processor and at least one memory including a computer program code, the at least one memory and the computer program code configured to, with the at least one processor, cause the apparatus at least to cause transmission of a first uplink transmission from a first user device, the first uplink transmission having a transmission time interval comprising a plurality of subframes, receive information from a base station, the information comprising an indication to pause transmission of the first uplink transmission for N subframes, pause transmission of the first uplink transmission for N subframes and cause, after N subframes, continued transmission of the first uplink transmission.

At least one of a second uplink transmission and a downlink transmission may be scheduled during at least a portion of the N subframes.

The at least one second uplink transmission may be scheduled for the first user device or a second user device.

The first uplink transmission may be associated with at least one of a mobile broadband service and a massive machine communication service. The at least one of the second uplink transmission and downlink transmission may be associated with a mission critical communication service.

The apparatus may be configured to pause the first uplink transmission during the transmission time interval.

N may be preconfigured.

N may be equal to 1.

The information may comprise an indication of N.

The information may comprise an indication to pause the first uplink transmission, and subsequently, after N subframes, an indication to continue the first uplink transmission The apparatus may be configured to receive the information on a physical layer control channel.

The apparatus may be configured to receive a scheduling grant for the first uplink transmission on the physical layer control channel.

The apparatus may be configured to determine at each subframe of the first uplink transmission whether the information has been received.

In a sixth aspect, there is provided an apparatus at least one processor and at least one memory including a computer program code, the at least one memory and the computer program code configured to, with the at least one processor, cause the apparatus at least to receive a first uplink transmission from a first user device, the first uplink transmission having a transmission time interval comprising a plurality of subframes, provide information to the user device, the information comprising an indication to pause transmission of the first uplink transmission for N subframes and receive, after N subframes, a continued transmission of the first uplink transmission.

The first uplink transmission may be paused during the transmission time interval.

The apparatus may be configured to schedule at least one of a second uplink transmission and downlink transmission during at least a portion of the N subframes.

The apparatus may comprise be configured to schedule the second uplink transmission during the N subframes and receive the second uplink transmission during at least a portion of N subframes.

The first uplink transmission may be associated with at least one of a mobile broadband service and a massive machine communication service. The at least one of the second uplink transmission and downlink transmission may be associated with a mission critical communication service.

N may be preconfigured.

N may be equal to 1.

The information may comprise an indication of N.

The information may comprise an indication to pause the first uplink transmission, and subsequently, after N subframes, an indication to continue the first uplink transmission The apparatus may be configured to provide the information on a physical layer control channel.

The apparatus may be configured to provide a scheduling grant for the first uplink transmission on the physical layer control channel.

In a seventh aspect, there is provided a computer program embodied on a non-transitory computer-readable storage medium, the computer program comprising program code for controlling a process to execute a process, the process comprising causing transmission of a first uplink transmission from a first user device, the first uplink transmission having a transmission time interval comprising a plurality of subframes, receiving information from a base station, the information comprising an indication to pause transmission of the first uplink transmission for N subframes, pausing transmission of the first uplink transmission for N subframes and causing, after N subframes, continued transmission of the first uplink transmission.

At least one of a second uplink transmission and a downlink transmission may be scheduled during at least a portion of the N subframes.

The at least one second uplink transmission may be scheduled for the first user device or a second user device.

The first uplink transmission may be associated with at least one of a mobile broadband service and a massive machine communication service. The at least one of the second uplink transmission and downlink transmission may be associated with a mission critical communication service.

The process may comprise pausing the first uplink transmission during the transmission time interval.

N may be preconfigured.

N may be equal to 1.

The information may comprise an indication of N.

The information may comprise an indication to pause the first uplink transmission, and subsequently, after N subframes, an indication to continue the first uplink transmission The process may comprise receiving the information on a physical layer control channel.

The process may comprise receiving a scheduling grant for the first uplink transmission on the physical layer control channel.

Receiving the information may comprise determining at each subframe of the first uplink transmission whether the information has been received.

In an eighth aspect, there is provided a computer program embodied on a non-transitory computer-readable storage medium, the computer program comprising program code for controlling a process to execute a process, the process comprising receiving a first uplink transmission from a first user device, the first uplink transmission having a transmission time interval comprising a plurality of subframes, providing information to the user device, the information comprising an indication to pause transmission of the first uplink transmission for N subframes and receiving, after N subframes, continued transmission of the first uplink transmission.

The first uplink transmission may be paused during the transmission time interval.

The process may comprise scheduling at least one of a second uplink transmission and downlink transmission during at least a portion of the N subframes.

The process may comprise scheduling the second uplink transmission during the N subframes and receiving the second uplink transmission during at least a portion of N subframes.

The first uplink transmission may be associated with at least one of a mobile broadband service and a massive machine communication service. The at least one of the second uplink transmission and downlink transmission may be associated with a mission critical communication service.

N may be preconfigured.

N may be equal to 1.

The information may comprise an indication of N.

The information may comprise an indication to pause the first uplink transmission, and subsequently, after N subframes, an indication to continue the first uplink transmission The process may comprise providing the information on a physical layer control channel.

The process may comprise providing a scheduling grant for the first uplink transmission on the physical layer control channel.

In an aspect there is provided a computer program product for a computer, comprising software code portions for performing the steps the method of the first and second aspect when said product is run on the computer.

A device for a communication system may comprise the apparatus according to the above aspects.

In the above, many different embodiments have been described. It should be appreciated that further embodiments may be provided by the combination of any two or more of the embodiments described above.

DESCRIPTION OF FIGURES

Embodiments will now be described, by way of example only, with reference to the accompanying Figures in which.

DETAILED DESCRIPTION

Before explaining in detail the examples, certain general principles of a wireless communication system and mobile communication devices are briefly explained with reference to FIGS. 1 to 2 to assist in understanding the technology underlying the described examples.

Figure 1:
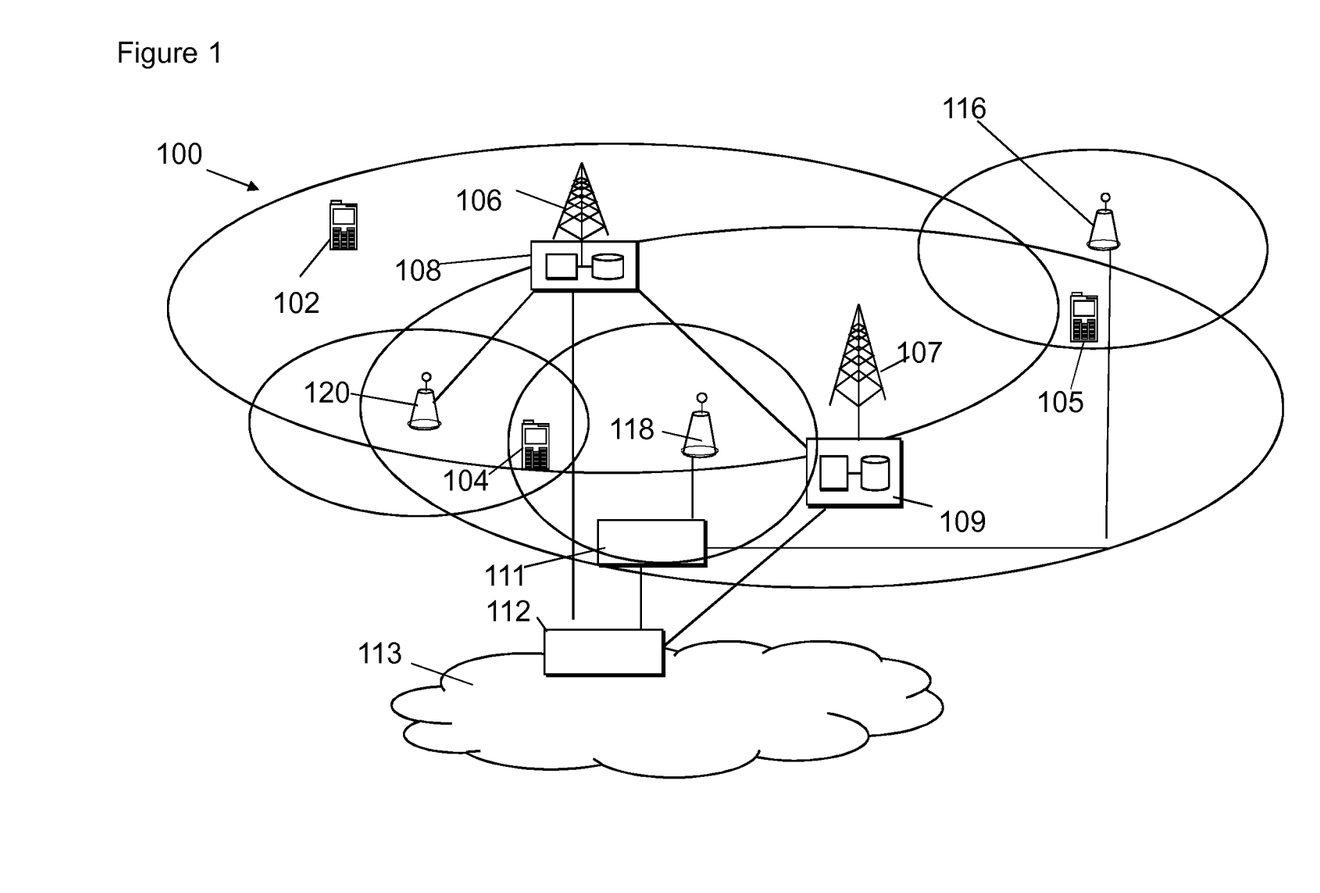
FIG. 1 shows a schematic diagram of an example communication system comprising a plurality of base stations and a plurality of communication devices.

In a wireless communication system 100, such as that shown in FIG. 1, a wireless communication devices, for example, user equipment (UE) or MTC devices 102, 104, 105 are provided wireless access via at least one base station or similar wireless transmitting and/or receiving wireless infrastructure node or point. Such a node can be, for example, a base station or an eNodeB (eNB) as in LTE or an access point (AP) in WLAN, or other wireless infrastructure node. These nodes will be generally referred to as base stations. Base stations are typically controlled by at least one appropriate controller apparatus, so as to enable operation thereof and management of mobile communication devices in communication with the base stations. The controller apparatus may be located in a radio access network (e.g. wireless communication system 100) or in a core network (CN) (not shown) and may be implemented as one central apparatus or its functionality may be distributed over several apparatus. The controller apparatus may be part of the base station and/or provided by a separate entity such as a Radio Network Controller. In FIG. 1 control apparatus 108 and 109 are shown to control the respective macro level base stations 106 and 107. In some systems, the control apparatus may additionally or alternatively be provided in a radio network controller. Other examples of radio access system comprise those provided by base stations of systems that are based on technologies such as 5G or new radio, wireless local area network (WLAN) and/or WiMax (Worldwide Interoperability for Microwave Access). A base station can provide coverage for an entire cell or similar radio service area.

In FIG. 1 base stations 106 and 107 are shown as connected to a wider communications network 113 via gateway 112. A further gateway function may be provided to connect to another network.

The smaller base stations 116, 118 and 120 may also be connected to the network 113, for example by a separate gateway function and/or via the controllers of the macro level stations. The base stations 116, 118 and 120 may be pico or femto level base stations or the like. In the example, stations 116 and 118 are connected via a gateway 111 whilst station 120 connects via the controller apparatus 108. In some embodiments, the smaller stations may not be provided.

Figure 2:
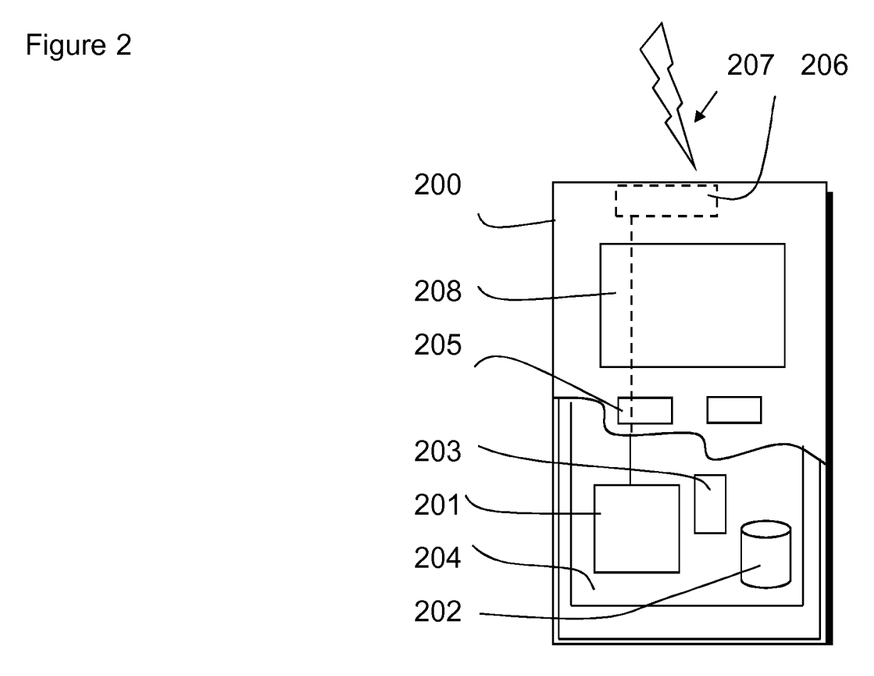
FIG. 2 shows a schematic diagram of an example mobile communication device.

A possible wireless communication device will now be described in more detail with reference to FIG. 2 showing a schematic, partially sectioned view of a communication device 200. Such a communication device is often referred to as user equipment (UE) or terminal. An appropriate mobile communication device may be provided by any device capable of sending and receiving radio signals. Non-limiting examples comprise a mobile station (MS) or mobile device such as a mobile phone or what is known as a 'smart phone', a computer provided with a wireless interface card or other wireless interface facility (e.g., USB dongle), personal data assistant (PDA) or a tablet provided with wireless communication capabilities, or any combinations of these or the like. A mobile communication device may provide, for example, communication of data for carrying communications such as voice, electronic mail (email), text message, multimedia and so on. Users may thus be offered and provided numerous services via their communication devices. Non-limiting examples of these services comprise two-way or multi-way calls, data communication or multimedia services or simply an access to a data communications network system, such as the Internet. Users may also be provided broadcast or multicast data. Non-limiting examples of the content comprise downloads, television and radio programs, videos, advertisements, various alerts and other information.

A wireless communication device may be for example a mobile device, that is, a device not fixed to a particular location, or it may be a stationary device. The wireless device may need human interaction for communication, or may not need human interaction for communication.

In the present teachings the terms UE or "user" are used to refer to any type of wireless communication device.

The wireless device 200 may receive signals over an air or radio interface 207 via appropriate apparatus for receiving and may transmit signals via appropriate apparatus for transmitting radio signals. In FIG. 2 transceiver apparatus is designated schematically by block 206. The transceiver apparatus 206 may be provided for example by means of a radio part and associated antenna arrangement. The antenna arrangement may be arranged internally or externally to the wireless device.

A wireless device is typically provided with at least one data processing entity 201, at least one memory 202 and other possible components 203 for use in software and hardware aided execution of tasks it is designed to perform, including control of access to and communications with access systems and other communication devices. The data processing, storage and other relevant control apparatus can be provided on an appropriate circuit board and/or in chipsets. This feature is denoted by reference 204. The user may control the operation of the wireless device by means of a suitable user interface such as key pad 205, voice commands, touch sensitive screen or pad, combinations thereof or the like. A display 208, a speaker and a microphone can be also provided. Furthermore, a wireless communication device may comprise appropriate connectors (either wired or wireless) to other devices and/or for connecting external accessories, for example hands-free equipment, thereto. The communication devices 102, 104, 105 may access the communication system based on various access techniques.

The following relates to uplink scheduling in a new 5G radio design, for example, cases with unicast transmissions. The following may be relevant to cases with where multiple services with different QoS requirements are multiplexed on a common air interface. As an example, the multiple services may comprise highly diverse services such as mobile broadband (MBB), massive machine communication (MMC), and mission critical communication (MCC). Meeting the envisioned requirements for 5G of ultra-reliability and low latency for MCC may be challenging.

Scheduling of users (a.k.a. per-user radio resource allocation) in the uplink may be complex, with additional dimensions when considering traffic with diverse requirements. For a new 5G radio, the scheduler may be able to multiplex users on a time-frequency grid of radio resources, as is the case for LTE. In LTE, the TTI size is fixed to 1 ms time-intervals (corresponding to 14 symbols). In the downlink (DL), the UE monitors for potential scheduling grants on the PDCCH during the first 1-3 symbols of the TTI. This means that the eNB may only issue new scheduling commands (i.e. scheduling grants on the PDCCH) on a time-resolution of every 1 ms time-interval. Once a UE has been scheduled for an UL transmission of transport block, the UE transmits during the entire 1 ms TTI time-period on the allocated frequency domain resources.

For new, or 5G, radio, the scheduler may be allowed to schedule users with different TTI sizes. The freedom to schedule users with different TTI sizes may allow more accurate per user adaptation according to the users QoS requirements, as well as their radio conditions. For example, highly coverage limited users may be best scheduled with longer TTIs, it may be desirable to serve MCC users with short TTIs to fulfil their strict latency requirements, MBB users may be most efficiently served with relatively medium to long TTIs depending on the application, etc.

For a fully loaded cell, e.g. one with a majority of the offered traffic coming from MBB and MMC, and a smaller fraction of the offered traffic originating from MCC, to have high trunking efficiency and full radio resource usage, the scheduler may allocate all available uplink transmission resources to MBB and MMC users, during times where there are no pending MCC transmission. When a need for MCC transmission(s) suddenly occurs, the scheduler, in principle, waits until the ongoing scheduled uplink MBB and MMC transmissions are completed, where-after it may then schedule the pending MCC traffic. However, using this approach may violate the QoS requirement of low latency for many MCC use cases, and thus may not be appropriate.

Alternatively, the scheduler may schedule the MCC transmissions on radio resources already used by ongoing MBB/MMC transmission. This alternative may jeopardize the QoS requirement of ultra-reliability for MCC due to interference. A third alternative would be to reserve some guaranteed resources for urgent MCC transmissions. However, such a solution may result in wasted radio resources during time periods with no pending MCC transmissions.

Figure 3:
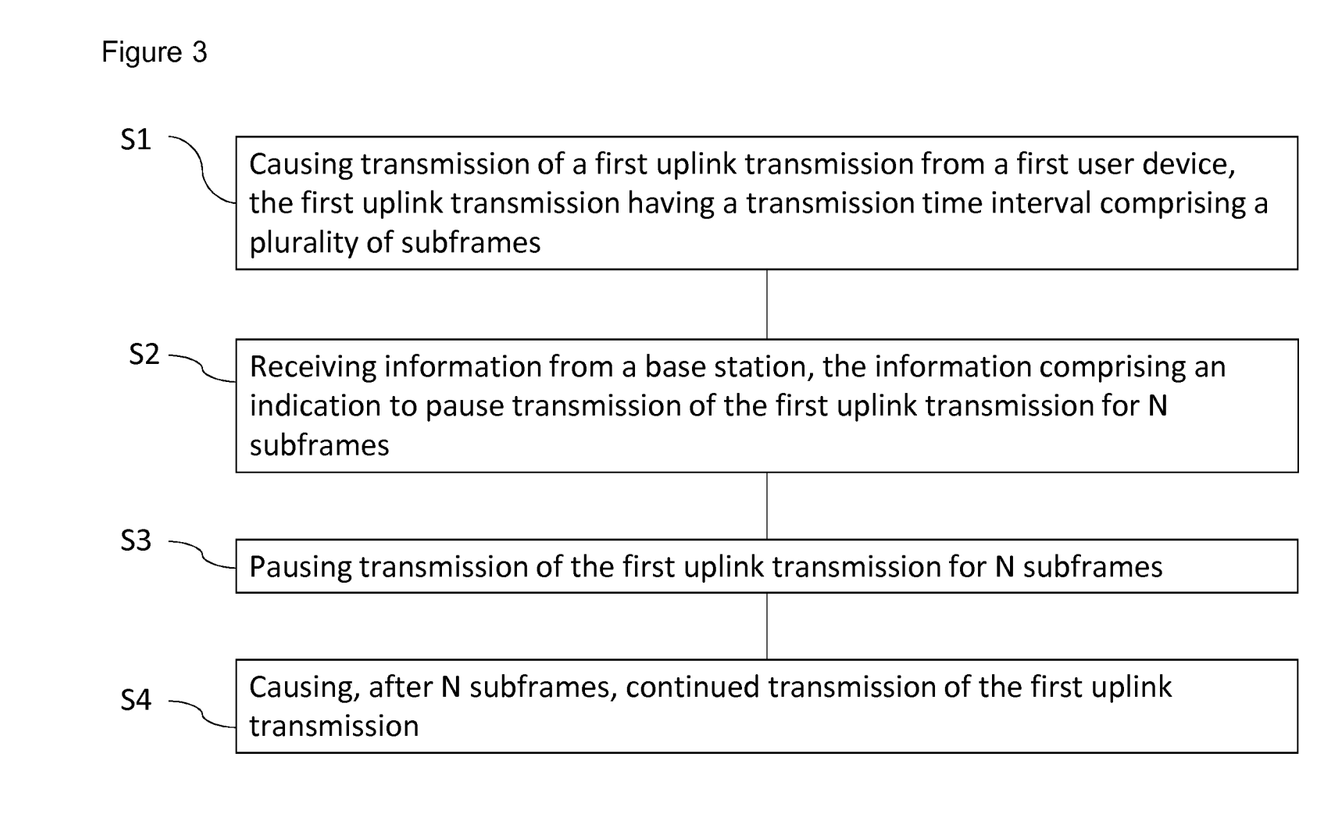
FIG. 3 shows a flowchart of an example method according to some embodiments.

FIG. 3 shows an example method of scheduling functionality for a user device. In a first step, S1, the method comprises causing transmission of a first uplink transmission from a first user device, the first uplink transmission having a transmission time interval comprising a plurality of subframes.

In a second step, S2, the method comprises receiving information from a base station, the information comprising an indication to pause transmission of the first uplink transmission for N subframes.

In a third step, S3, the method comprises pausing transmission of the first uplink transmission for N subframes and, in a fourth step, S4, the method comprises causing, after N subframes, continued transmission of the first uplink transmission.

The method comprises pausing the first uplink transmission during the transmission time interval (TTI). That is, the transmission is paused on a subframe resolution within the ongoing TTI.

At least one second uplink transmission may be scheduled during at least a portion of the N subframes. Alternatively, or in addition, a downlink transmission may be scheduled during at least a portion of the N subframes. The second uplink transmission, or downlink transmission may be scheduled for the first user device, or a second user device. The second user device may be a MTC device.

The first uplink transmission may be associated with one of an MBB service and an MMC service. The second uplink transmission, and/or downlink transmission, may be associated with a MCC service.

The base station may be an eNB. The base station (which be referred to herein as eNB) schedules user devices in the cell associated with the base station. The first uplink transmission, second uplink transmission and/or downlink transmission may be scheduled by the base station. The uplink scheduling may be conducted by sending scheduling grants in the downlink to the user devices in the cell. The scheduling grants may be sent on a physical layer control channel (e.g. physical downlink control channel (PDCCH)). Among others, the scheduling grant include pointers to time-frequency uplink resources that the user devices shall use.

The eNB may choose to schedule user devices with different TTI sizes; e.g. on subframe resolution. The TTI size may depend on the service (e.g., MBB, MMC or MCC). For example, MBB and MMC users may be scheduled over multiple subframes.

The eNB may choose to configure user devices (such as MBB and MMC users) that are scheduled in the UL over multiple subframes (i.e. longer TTIs) to monitor for DL physical channel carrying the scheduling grants multiple times during the transmission (e.g. on a subframe resolution of the TTI, for example, on every subframe, or every second or third subframe, or the like). Receiving the information may comprise determining regularly, for example at each subframe or every nth subframe of the first uplink transmission, whether the information has been received.

The indication to stop the current ongoing (e.g., the first) uplink transmission (for example, for N subframes) may be referred to as a pause-resume signalling message. If a need for urgent usage of the respective resources occurs, such as for example scheduling of an MCC user, the eNB can chose to send the pause-resume signalling message to one (or multiple) users that have an ongoing UL transmission over multiple subframes.

The pause-resume signalling message may inform the UE(s) to put its ongoing uplink transmission on pause for N consecutive subframes, whereafter the UE may continue (resume) its uplink transmission of the first uplink transmission (e.g. cause continued transmission of the first uplink transmission). The UE may resume transmission from the point it was interrupted. In alternative embodiments, the UE may repeat some portion of the interrupted transmission, for example, it may resend all the subframes of the interrupted TTI. The resources released due to interrupted transmission, may further be used for example for more urgent transmission/reception.

N may be preconfigured. For example, in one embodiment of the invention, N could be a fixed value (for example, N=1). This may simplify the eNB-to-UE signalling procedure. In a second embodiment, the value of N could be included in the pause-resume signalling message, e.g. the information received from the base station may comprise an indication of N.

In one embodiment, the pause-resume signalling message may be sent on the same downlink physical layer control channel as that carrying the standard scheduling grants. Alternatively, or in addition, the pause-resume signalling message could also be mapped to another downlink physical layer control channel.

In some embodiments, the pause-resume signalling message may inform the UE(s) to put its ongoing uplink transmission on pause without specifying the length of the pause. That is, the information may comprise an indication to pause the first uplink transmission, and later, after N subframes, an indication to continue the first uplink transmission. The pausing may happen during the on-going transmission time interval (TTI). In some embodiments, the eNB may schedule another, possibly more urgent, transmission on the released resources for the same, or another, UE. The UE, whose transmission was interrupted, may later resume the interrupted transmission upon reception of a corresponding indication to do so. The UE may resume the transmission from the point it was interrupted. In alternative embodiments, the UE may continue the transmission for example from the beginning of the TTI, during which the transmission was interrupted.

The eNB scheduler may be able to release uplink transmission resources that the scheduler can use for fast scheduling of MCC without any own-cell interference. This is achieved by temporarily pausing ongoing MBB/MMC transmissions that are thereafter resumed to minimize the loss for these service types.

A method as described with reference to FIG. 3, may provide an enhanced uplink scheduling functionality, which allows ongoing MBB/MMC uplink scheduled transmissions to be put on pause to allow quick scheduling of short MCC transmissions. The paused MBB/MMC uplink transmission is afterwards resumed. Thus, the method may provide an uplink scheduling mechanism that releases uplink transmission resources for latency critical MCC transmissions.

Figure 4:
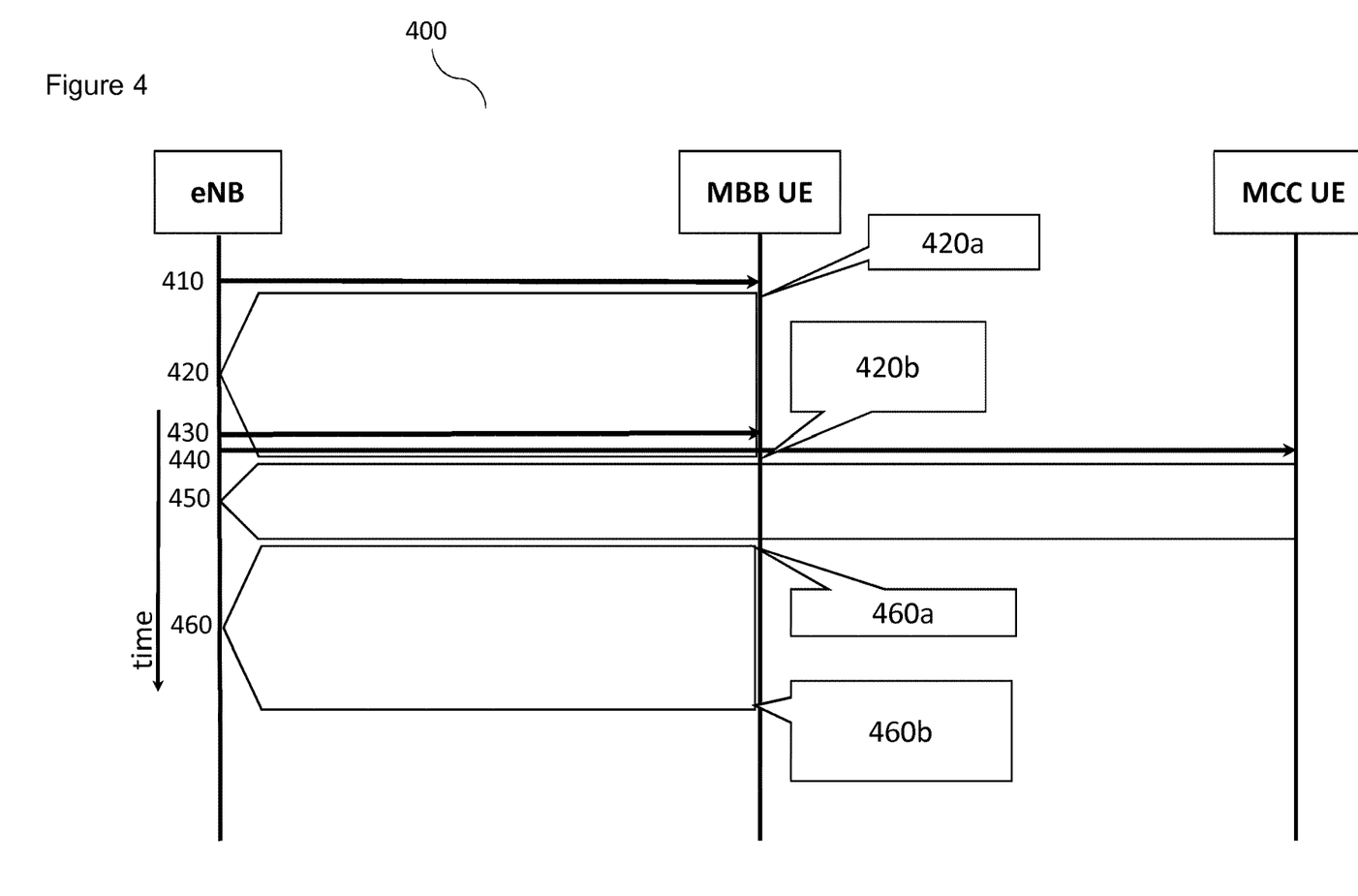
FIG. 4 shows a signalling flow diagram according to some embodiments.

FIG. 4 shows an example signalling flow diagram 400 according to some embodiments. Here an eNB schedules 410 a MBB UE with a first UL TTI transmission over multiple subframes by sending a scheduling grant. The first uplink transmission TTI 420 is started at a time 420a. During the time of the ongoing UL transmission from the MBB UE, the eNB transmits 430 a pause-resume message to the MBB UE, putting the UL transmission on pause for short time period (e.g. N subframes) at time 420b. At the same time, the eNB may further schedule 440 a MCC UE with a short (at most N subframe TTI size) UL transmission 450 during the time where the transmission from the MBB UE is on pause. Afterwards, starting at 460a, the remainder of the originally scheduled MBB transmission 460 may be resumed. Hence, the two arrows 420a to 420b and 460a to 460b from the MBB UE to the eNB illustrate the transmission of the longer TTI (i.e. one transport block) from the MBB to the eNB and the arrow 450 illustrates the transmission of the shorter TTI from the MCC UE.

Figure 5:
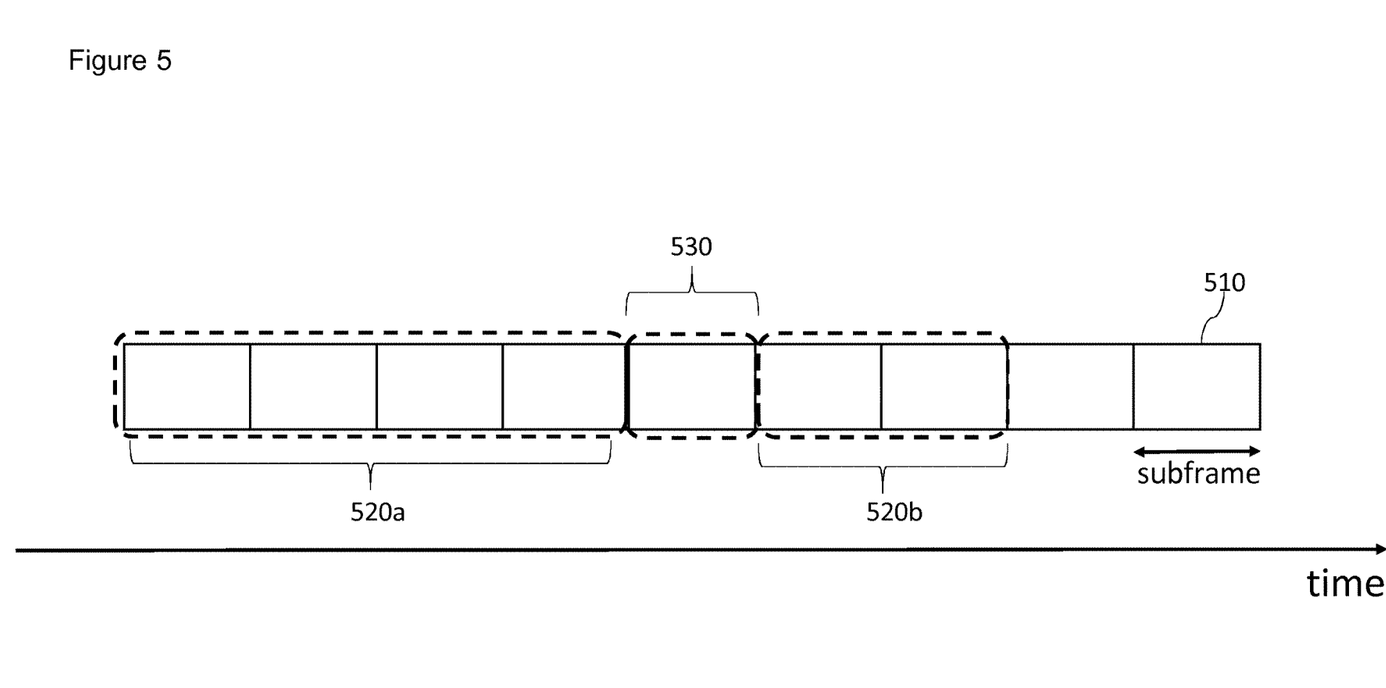
FIG. 5 shows a schematic diagram of a plurality of subframes according to some embodiments.

FIG. 5 shows a schematic diagram of an example of an UL transmission according to some embodiments. In the example shown in FIG. 5, the eNB schedules a MBB/MMC user to transmit with a TTI size corresponding to 6 subframes 510 in the uplink. The TTI size may be configurable at a symbol resolution such that the TTI size is expressed as an integer of N consecutive symbols. The subframe size for 5G may be as small as 0.1-0.2 ms, but may also take other values. The MBB/MMC UE starts the corresponding scheduled transmission 520a.

During that transmission, the MBB/MMC UE receives a pause-resume message, and stops the ongoing MBB/MMC transmission for one subframe 530, while afterwards resuming the MBB/MMC transmission to transmit the last two subframes 520b of the TTI. During the subframe where the ongoing MBB/MMC transmission is put on pause, the eNB schedules the latency critical MCC transmission.

A method as described with reference to FIGS. 3 to 5 may allow the eNB scheduler to release cell resources for urgent uplink MCC transmissions, by temporarily putting ongoing MBB/MMC transmissions on standby. This may be advantageous to meet the challenging latency and ultra-reliability requirements for MCC.

The method may be implemented in specifications defining general scheduler functionality, such as eNB-to-UE signalling procedures and UE behaviour for uplink scheduling, including the pause and resume functionality.

It should be understood that each block of the flowchart of the Figures and any combination thereof may be implemented by various means or their combinations, such as hardware, software, firmware, one or more processors and/or circuitry.

It is noted that whilst embodiments have been described in relation to one example of a 5G network, similar principles maybe applied in relation to other examples of new radio networks. It should be noted that other embodiments may be based on other cellular technology other than 5G or on variants of 5G. Therefore, although certain embodiments were described above by way of example with reference to certain example architectures for wireless networks, technologies and standards, embodiments may be applied to any other suitable forms of communication systems than those illustrated and described herein.

It is also noted herein that while the above describes example embodiments, there are several variations and modifications which may be made to the disclosed solution without departing from the scope of the present invention.

Figure 6:
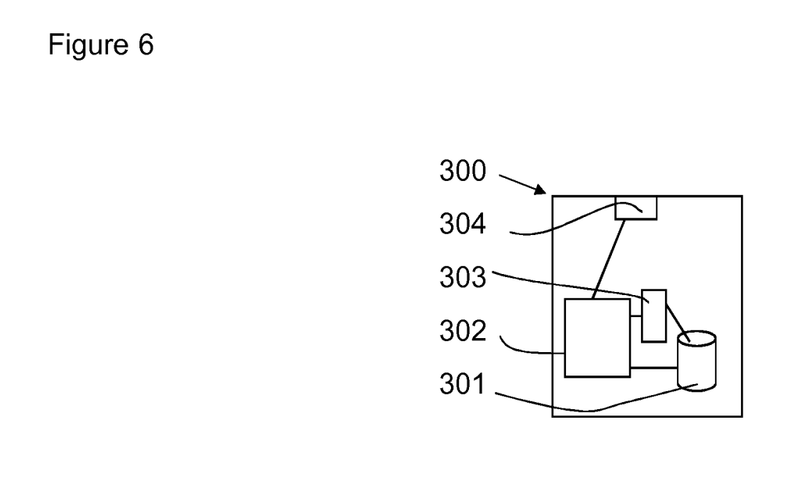
FIG. 6 shows a schematic diagram of an example control apparatus.

The method may be implemented in such as a control apparatus as shown in FIG. 6. The method may be implanted in a single processor 201 or control apparatus or across more than one processor or control apparatus. FIG. 6 shows an example of a control apparatus for a communication system, for example to be coupled to and/or for controlling a station of an access system, such as a RAN node, e.g. a base station, (e) node B, a central unit of a cloud architecture or a node of a core network such as an MME or S-GW, a scheduling entity such as a spectrum management entity, or a server or host. The control apparatus may be integrated with or external to a node or module of a core network or RAN. In some embodiments, base stations comprise a separate control apparatus unit or module. In other embodiments, the control apparatus can be another network element such as a radio network controller or a spectrum controller. In some embodiments, each base station may have such a control apparatus as well as a control apparatus being provided in a radio network controller. The control apparatus 300 can be arranged to provide control on communications in the service area of the system. The control apparatus 300 comprises at least one memory 301, at least one data processing unit 302, 303 and an input/output interface 304. Via the interface the control apparatus can be coupled to a receiver and a transmitter of the base station. The receiver and/or the transmitter may be implemented as a radio front end or a remote radio head. For example the control apparatus 300 or processor 201 can be configured to execute an appropriate software code to provide the control functions. Control functions may comprise causing transmission of a first uplink transmission from a first user device, the first uplink transmission having a transmission time interval comprising a plurality of subframes, receiving information from a base station, the information comprising an indication to pause transmission of the first uplink transmission for N subframes, pausing transmission of the first uplink transmission for N subframes and causing, after N subframes, continued transmission of the first uplink transmission.

Alternatively, or in addition, control functions may comprise receiving a first uplink transmission from a first user device, the first uplink transmission having a transmission time interval comprising a plurality of subframes, providing information to the user device, the information comprising an indication to pause transmission of the first uplink transmission for N subframes and receiving, after N subframes, continued transmission of the first uplink transmission.

It should be understood that the apparatuses may comprise or be coupled to other units or modules etc., such as radio parts or radio heads, used in or for transmission and/or reception. Although the apparatuses have been described as one entity, different modules and memory may be implemented in one or more physical or logical entities.

In an embodiment at least some of the functionalities of the apparatus of FIG. 6 may be shared between two physically separate devices forming one operational entity. Therefore, the apparatus may be seen to depict the operational entity comprising one or more physically separate devices for executing at least some of the described processes. The apparatus utilizing such shared architecture, may comprise a remote control unit (RCU), such as a host computer or a server computer, operatively coupled (e.g. via a wireless or wired network) to a remote radio head (RRH) located in the base station. In an embodiment, at least some of the described processes may be performed by the RCU. In an embodiment, the execution of at least some of the described processes may be shared among the RRH and the RCU.

In an embodiment, the RCU may generate a virtual network through which the RCU communicates with the RRH. In general, virtual net-working may involve a process of combining hardware and software network resources and network functionality into a single, software-based administrative entity, a virtual network. Network virtualization may involve platform virtualization, often combined with resource virtualization. Network virtualization may be categorized as external virtual networking which combines many net-works, or parts of networks, into the server computer or the host computer (i.e. to the RCU). External network virtualization is targeted to optimized network sharing. Another category is internal virtual networking which provides net-work-like functionality to the software containers on a single system. Virtual networking may also be used for testing the terminal device.

In an embodiment, the virtual network may provide flexible distribution of operations between the RRH and the RCU. In practice, any digital signal processing task may be performed in either the RRH or the RCU and the boundary where the responsibility is shifted between the RRH and the RCU may be selected according to implementation.

It should be understood that the apparatuses may comprise or be coupled to other units or modules etc., such as radio parts or radio heads, used in or for transmission and/or reception. Although the apparatuses have been described as one entity, different modules and memory may be implemented in one or more physical or logical entities.

In general, the various embodiments may be implemented in hardware or special purpose circuits, software, logic or any combination thereof. Some aspects of the invention may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the mobile device, such as in the processor entity, or by hardware, or by a combination of software and hardware. Computer software or program, also called program product, including software routines, applets and/or macros, may be stored in any apparatus-readable data storage medium and they comprise program instructions to perform particular tasks. A computer program product may comprise one or more computer-executable components which, when the program is run, are configured to carry out embodiments. The one or more computer-executable components may be at least one software code or portions of it.

Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD. The physical media is a non-transitory media.

The memory may be of any type suitable to the local technical environment and may be implemented using any suitable data storage technology, such as semiconductor based memory devices, magnetic memory devices and systems, optical memory devices and systems, fixed memory and removable memory. The data processors may be of any type suitable to the local technical environment, and may comprise one or more of general purpose computers, special purpose computers, microprocessors, digital signal processors (DSPs), application specific integrated circuits (ASIC), FPGA, gate level circuits and processors based on multi core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The foregoing description has provided by way of non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims.

Indeed there is a further embodiment comprising a combination of one or more embodiments with any of the other embodiments previously discussed.

The invention claimed is:

1. An apparatus comprising:
at least one processor and at least one memory including a computer program code, the at least one memory and the computer program code configured to, with the at least one processor, cause the apparatus at least to:
cause transmission of a first uplink transmission for a mobile broadband communication from a first user device, the first uplink transmission having a transmission time interval comprising a plurality of subframes;
receive information from a base station during the transmission time interval, the information comprising an indication to pause during the transmission time interval transmission of the first uplink transmission for N subframes within the transmission time interval;
scheduling a transmission for a mission critical communication during said pause for a transmission time interval duration shorter than said transmission time interval;
based on the information pause, within the transmission time interval transmission of the first uplink transmission, for N subframes; and cause, after the pause for N subframes, continued transmission of a remainder of the first uplink transmission for the mobile broadband communication.

2. The apparatus according to claim 1, wherein at least one of a second uplink transmission and a downlink transmission is scheduled during at least a portion of the N subframes.

3. The apparatus according to claim 1, wherein the at least one second uplink transmission is scheduled for the first user device or a second user device.

4. The apparatus according to claim 1, wherein the first uplink transmission is associated with at least one of a mobile broadband service and a massive machine communication service and the at least one of the second uplink transmission and downlink transmission is associated with a mission critical communication service.

5. The apparatus according to claim 1, wherein N is preconfigured.

6. The apparatus according to claim 1, wherein the information comprises an indication of N.

7. The apparatus according to claim 1, wherein the apparatus is configured to receive the information on a physical layer control channel.

8. The apparatus according to claim 1, wherein the apparatus is configured to receive a scheduling grant for the first uplink transmission on a physical layer control channel.

9. The apparatus according to claim 1, wherein the apparatus is configured to determine at each subframe of the first uplink transmission whether the information has been received.

10. An apparatus comprising:
   at least one processor and at least one memory including a computer program code, the at least one memory and the computer program code configured to, with the at least one processor, cause the apparatus at least to:
   receive a first uplink transmission from a first user device, the first uplink transmission having a transmission time interval comprising a plurality of subframes;
   provide information to the user device during the transmission time interval, the information comprising an indication to pause during the transmission time interval transmission of the first uplink transmission for N subframes, wherein the pause is for N subframes within the transmission time interval and is for a scheduled a mission critical communication during said pause with a transmission time interval duration that is shorter than said transmission time interval; and
   receive, after the pause for N subframes, a remainder of a continued transmission of the first uplink transmission for a mobile broadband communication.

11. The apparatus according to claim 10, wherein the apparatus is configured to schedule at least one of a second uplink transmission and downlink transmission during at least a portion of the N subframes.

12. The apparatus according to claim 10, wherein the apparatus is configured to schedule the second uplink transmission during the N subframes; and to receive the second uplink transmission during at least a portion of N subframes.

13. The apparatus according to claim 10, wherein the first uplink transmission is associated with at least one of a mobile broadband service and a massive machine communication service and the at least one of the second uplink transmission and downlink transmission is associated with a mission critical communication service.

14. The apparatus according to claim 10, wherein N is preconfigured.

15. The apparatus according to claim 10, wherein the information comprises an indication of N.

16. The apparatus according to claim 10, wherein the apparatus is configured to provide the information on a physical layer control channel.

17. The apparatus according to claim 10, wherein the apparatus is configured to provide a scheduling grant for the first uplink transmission on a physical layer control channel.

18. A method comprising:
   causing transmission of a first uplink transmission for mobile broadband communication from a first user device, the first uplink transmission having a transmission time interval comprising a plurality of subframes;
   receiving information from a base station during the transmission time interval, the information comprising an indication to pause during the transmission time interval transmission of the first uplink transmission for N subframes within the transmission time interval;
   schedule a transmission for a mission critical communication during said pause for a transmission time interval duration shorter than said transmission time interval;
   based on the information, pausing during the transmission time interval transmission of the first uplink transmission for said N subframes; and
   causing, after the pause for said N subframes, continued transmission of a remainder of the first uplink transmission for the mobile broadband communication.

19. The method according to claim 18, wherein at least one of a second uplink transmission and a downlink transmission is scheduled during at least a portion of the N subframes.

\* \* \* \* \*